(12) United States Patent
Konno

(10) Patent No.: US 6,759,828 B2
(45) Date of Patent: Jul. 6, 2004

(54) REMOTE LOCK OPERATION APPARATUS FOR LIGHT VEHICLE

(75) Inventor: Takeshi Konno, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 129 days.

(21) Appl. No.: 10/076,491

(22) Filed: Feb. 19, 2002

(65) Prior Publication Data

US 2002/0121971 A1 Sep. 5, 2002

(51) Int. Cl.[7] .............................................. B60K 28/00
(52) U.S. Cl. ...................................... 320/9.1; 180/286
(58) Field of Search .............................. 307/9.1–10.6; 340/825.69, 825.72, 825.3–825.34; 180/286, 287; 70/252, 256

(56) References Cited

U.S. PATENT DOCUMENTS

| | | | |
|---|---|---|---|
| 4,113,193 A | | 9/1978 | Sanada et al. |
| 5,124,565 A | * | 6/1992 | Yoshida et al. ............ 340/5.61 |
| 2001/0012709 A1 | * | 8/2001 | Nakao et al. .............. 439/76.2 |
| 2002/0113490 A1 | * | 8/2002 | Konno ........................ 307/9.1 |
| 2002/0121808 A1 | * | 9/2002 | Konno et al. ................ 307/9.1 |
| 2003/0024754 A1 | * | 2/2003 | Konno et al. ................ 180/287 |

FOREIGN PATENT DOCUMENTS

| | | | |
|---|---|---|---|
| EP | 0886125 A2 | 12/1998 | |
| EP | 1057720 A2 | 12/2000 | |
| FR | 2754226 A1 | 4/1998 | |
| JP | 03295777 A | * 12/1991 | ............ B62H/5/20 |
| WO | WO 98/25812 A1 | 6/1998 | |

* cited by examiner

Primary Examiner—Gregory J. Toatley, Jr.
(74) Attorney, Agent, or Firm—Birch, Stewart, Kolasch & Birch, LLP

(57) ABSTRACT

This invention relates to a remote lock operation apparatus for a light vehicle having a bar handle and a switch case and having no cabin. One objective of the invention is to make it possible for the infrared receiver of the remote lock operation apparatus to cover a range of directivity without being influenced by the seat or the vehicle body rear portion. Another objective is to protect the infrared receiver from the weather and mischief. These objectives are achieved by having an infrared receiver provided on a switch case, with a switch operation element provided on a steering bar handle of a vehicle, thereby protecting the infrared receiver from potential damage while at the same time positioning it so that it can be easily operable by a passenger.

7 Claims, 10 Drawing Sheets

REMOTE LOCK OPERATION APPARATUS FOR LIGHT VEHICLE

CROSS-REFERENCE TO RELATED APPLICATIONS

The present application claims priority under 35 U.S.C. §119 to Japanese Patent Application Nos. 2001-042275 and 2001-042277, filed on Feb. 19, 2001, the entire contents thereof are hereby incorporated by reference.

BACKGROUND OF THE INVENTION

1. Field of the Invention

This invention relates to a remote lock operation apparatus for a light vehicle having no cabin. It is to be noted that the "light vehicle having no cabin" in the present invention may be any of a two-wheel car, a three-wheel car and a four-wheel car of the saddle-ride type and the seated type, and may include or not include a prime mover. For example, a motorcycle, a scooter, a bicycle and so forth are included in the two-wheel car.

2. Description of Background Art

In a conventional motorcycle, scooter or the like, various locking mechanisms for preventing theft or mischief such as, for example, a main stand locking apparatus, a steering handle locking apparatus, a seat locking apparatus and so forth are provided at suitable locations of a vehicle body. Those locking mechanisms can be locked and unlocked arbitrarily by a driver operating a locking operation section provided on the vehicle body side through a key operation.

Meanwhile, in four-wheel cars in recent years, an apparatus wherein a door locking mechanism can be locked and unlocked without a key by means of a remote lock operation apparatus which uses an infrared signal.

Thus, it is a possible idea to make it possible to lock and unlock the locking mechanism for a light vehicle such as a motorcycle having no cabin without a key by means of a remote lock operation apparatus which uses an infrared signal.

In this instance, the light vehicle is different from a four-wheel automobile in that it does not have a cabin which is surrounded by a roof, a side door and so forth, and an entire appearance of the vehicle body including a handle part and members around the handle part is exposed widely to the outside. Accordingly, when it is intended to provide an infrared receiver on an outer face of such a vehicle body as just described (particularly at the handle part or a member around the handle part), it is desired to eliminate alteration of an appearance part of the vehicle body to the utmost, thereby making the infrared receiver less striking.

Further, a light vehicle without a cabin may suffer from having the infrared receiver exposed to the sun, wind and rain, and also subject to mischief. In order to prevent such problems, it is necessary to additionally provide a special guard mechanism or waterproof mechanism for the infrared receiver. This increase the cost.

Meanwhile, the directivity required for an infrared receiver for the light vehicle generally is within the range of 45 degrees on the left and the right with respect to a longitudinal center line of the vehicle body as viewed rearwardly from the position of the left and right handle grips of the vehicle in the forward and backward direction of the vehicle body as seen in FIG. 1. Accordingly, the mounted position of the infrared receiver is preferably set to such a position at which the receiver can cover at least the directivity range without being influenced by the seat or a vehicle body rear portion.

The present invention has been proposed taking the foregoing into consideration, and it is an object of the present invention to provide a remote lock operation apparatus for a light vehicle which can satisfy the requirement described above, and is simple in structure and light in weight.

SUMMARY AND OBJECTS OF THE INVENTION

In order to attain the object described above, a remote lock operation apparatus for a light vehicle having no cabin of the present invention included a portable infrared transmitter, an infrared receiver capable of receiving an infrared signal emitted from the infrared transmitter, a lock actuator capable of locking and unlocking a lock mechanism incorporated in a vehicle body, and a control apparatus for controlling operation of the lock actuator based on the infrared signal received by the infrared receiver. Further, the infrared receiver is provided on a switch case having a switch operation element manually operable by a passenger and provided on a steering bar handle of the vehicle.

Accordingly, since the switch case with a switch operation element conventionally provided usually on a bar handle of a light vehicle can be used also as a support part for the infrared receiver, the support structure can be simplified and its weight and cost reduced. Further, since the switch case is disposed at a base portion of a handle grip of the bar handle which is usually provided at a higher position than the seat or a vehicle body rear portion, through the fact that the infrared receiver is disposed on such a switch case as just described, the range of directivity of the infrared receiver required for a light vehicle of the type described can be covered readily without being influenced by the seat or the vehicle body rear portion.

Additionally, the invention includes a control unit formed as a unitary member from the control apparatus and the infrared receiver is held on the switch case. Accordingly, since the infrared receiver and the control apparatus are formed as a unit, the structure of the remote lock operation apparatus can be further simplified and reduced in weight and size. Also, the work of assembling the structure together with the vehicle is further simplified.

Further, a remote lock operation apparatus for a light vehicle having no cabin of the present invention includes an arrangement wherein the Infrared receiver is disposed on a meter having a transparent cover and provided at a position at which the meter can be visually observed by a driver and is covered with and protected by the transparent cover.

Accordingly, since the Infrared receiver is covered with and protected by the transparent cover of the meter, even if the vehicle does not have a cabin covered therearound with a roof, there is no possibility that the infrared receiver may be exposed directly to a wind, rain or the sun, or be subject to mischief by a third party. Besides, since the transparent cover provided originally for the meter serves also as a protective cover for the infrared receiver, there is no necessity to provide a special guard mechanism or waterproof mechanism for the Infrared receiver. Further, since the meter is usually disposed at a position higher than the seat and the vehicle body rear portion in the proximity of the central portion of the vehicle body in the leftward and rightward direction, the range of directivity of the Infrared receiver required for a light vehicle of the type described can be covered readily without being influenced by the seat or the vehicle body rear portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
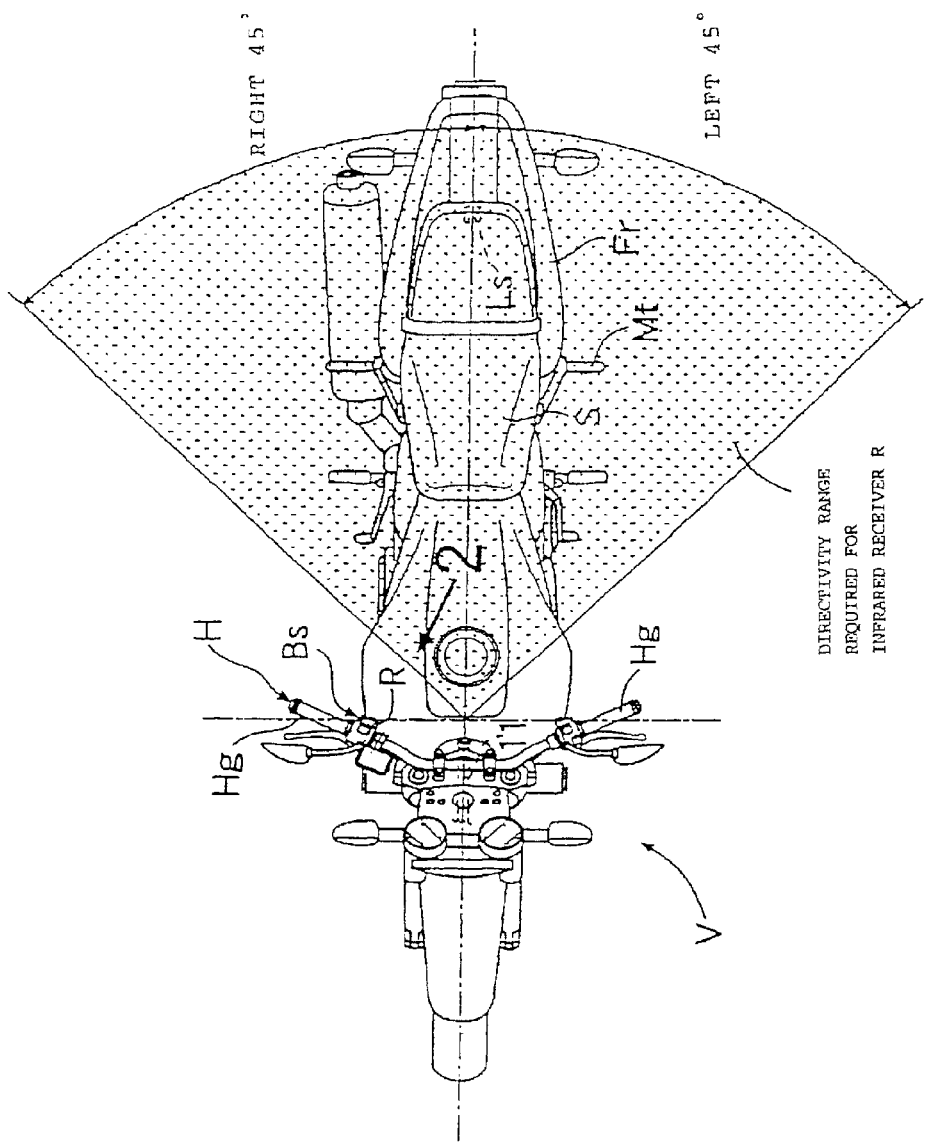
FIG. 1 is a plan view of the motorcycle of the first embodiment.
Figure 2:
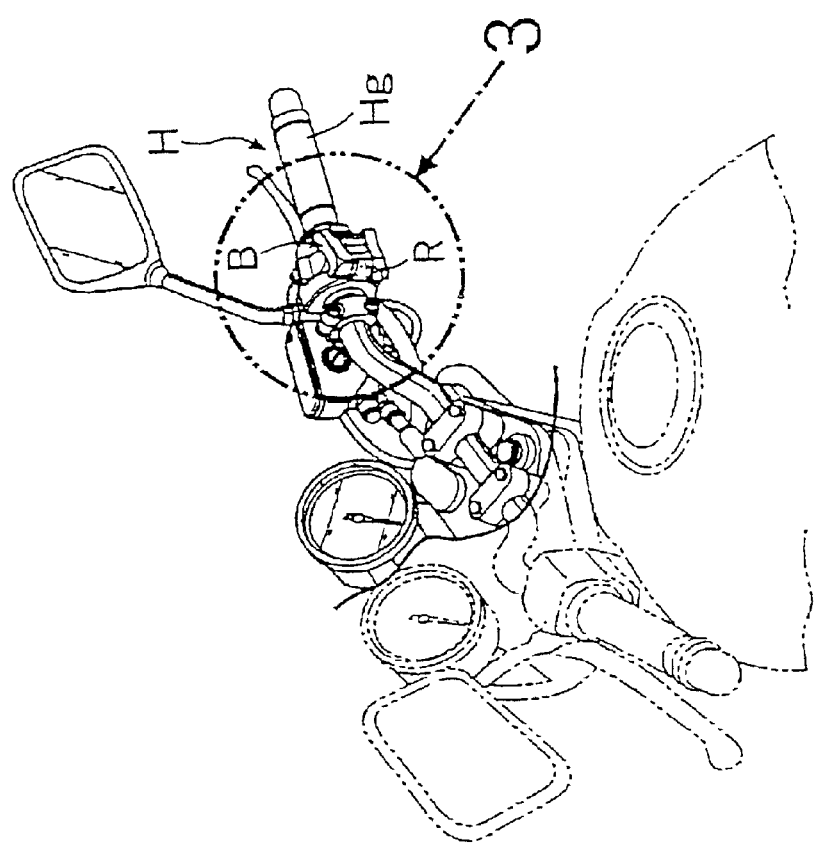
FIG. 2 is a perspective view of a handle part of the motorcycle of the first embodiment.
Figure 3:
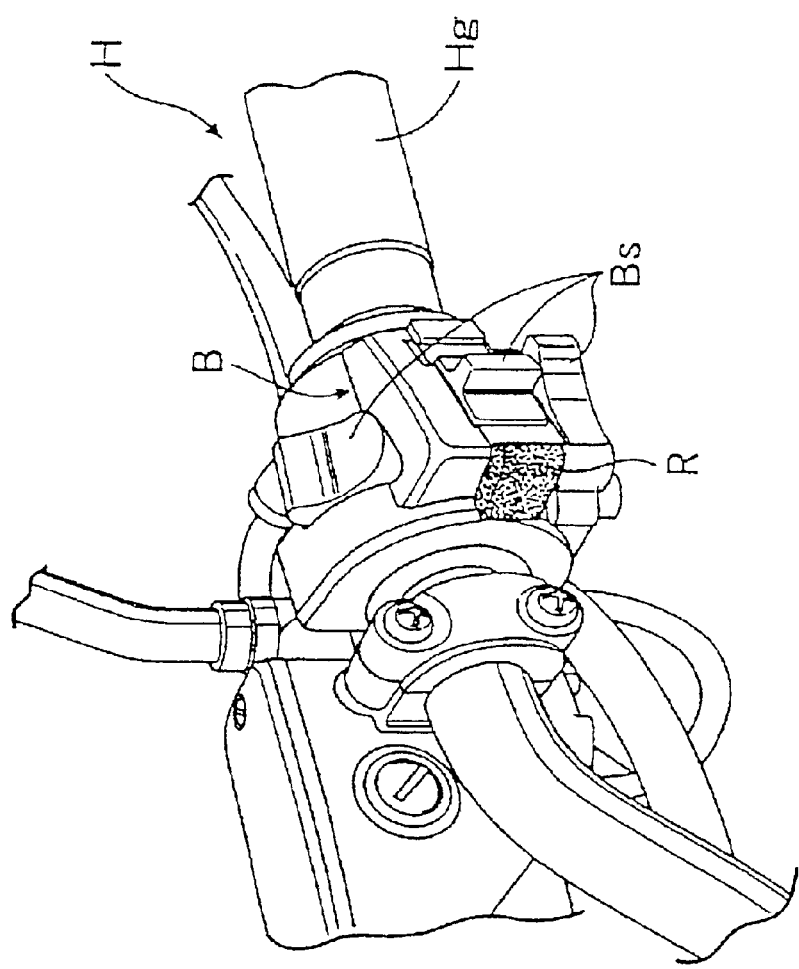
FIG. 3 is an enlarged view of the motorcycle of the first embodiment, as viewed in a direction indicated by an arrow mark 3 of FIG. 2.
Figure 4:
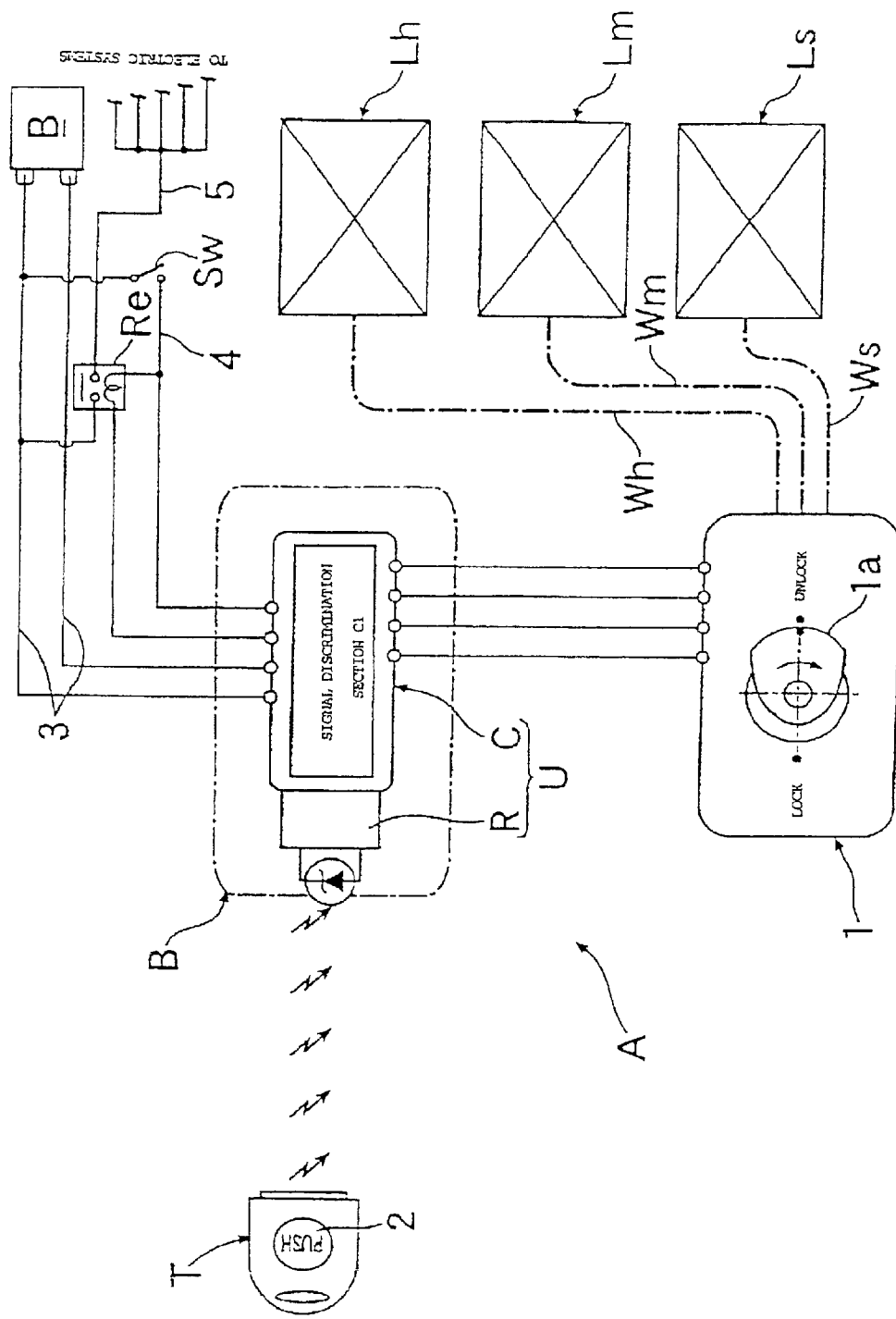
FIG. 4 is a schematic block diagram of a remote lock operation apparatus of the motorcycle of the first embodiment.

First, in the first embodiment shown in FIGS. 1 to 4, a motorcycle V as a light vehicle having no cabin includes a bar handle H provided on the front side with respect to a seat S and operable for steering a front wheel Wf through a steering shaft 11. An upper end portion of the steering shaft 11 is coupled to a mid portion of the bar handle H, and left and right handle grips Hg for being gripped by the hands of the passenger upon driving are provided continuously to the left and right end portions of the bar handle H.

Further, a pair of left and right switch cases B are disposed on and fixed to the bar handle H in the proximity of base portions of the left and right handle grips Hg. Several switch operation elements Bs (for example, a headlamp switch operation element, a horn switch operation element, an operation element of a main switch Sw which is hereinafter described, a starter switch operation element and so forth) manually operable by a passenger are provided in a suitably distributed state on the left and right switch cases B.

Further, an infrared receiver R which is hereinafter described is disposed on a side face on the center side of the handle, that is, a face on the side opposing to the passenger who tries to ride on the motorcycle V, of at least one (in the embodiment shown, the right side one) of the left and right switch cases B.

Further, several locking mechanisms are provided. These include a handle lock mechanism Lh for controlling pivotal motion of the handle H upon parking, a stand lock mechanism Lm for locking a main stand Mt, which can be pivoted between an upright position and a horizontal accommodated position, at the upright position, and a seat lock mechanism Ls for locking the seat S, which can open and close an open top of a baggage accommodating seat box (not shown) in a vehicle body rear portion Fr. Since the structure of the lock mechanisms Lh, Lm and Ls is conventionally known, description of the detailed structure of them is omitted.

Operation wires Wh, Wm and Ws extend from the lock mechanisms Lh, Lm and Ls, respectively. A single common electrically driven lock actuator 1 for locking and unlocking the lock mechanisms Lh, Lm and Ls through the operation wires Wh, Wm and Ws is provided at a suitable location of the vehicle body. The lock actuator 1 forms part of an remote lock operation apparatus A of the present invention, and performs a locking operation or an unlocking operation in accordance with an instruction signal from the electronic control circuit C. Control circuit C is a control apparatus accommodated and fixed in the switch case B for locking or unlocking the lock mechanisms Lh, Lm and Ls without a key.

The remote lock operation apparatus A mentioned above includes, in addition to the lock actuator 1 and the electronic control circuit C, an infrared transmitter T of a small size which can be carried by the passenger, and an infrared receiver R disposed in the switch case B so that it can receive an infrared signal emitted from the transmitter T. An operation switch 2 operable for inputting locking or unlocking is provided for the transmitter T, and a signal transmission section (not shown) capable of transmitting an infrared signal corresponding to a particular ID code in response to an operation input for the switch 2 is built in the transmitter T. It is to be noted that such a structure of the infrared transmitter as just described is conventionally known in the art.

The electronic control circuit C includes a signal discrimination section C1 including a CPU and a memory. The signal discrimination section C1 includes ID verification means for verifying and discriminating whether or not an infrared signal received by the infrared receiver R is legal, that is, whether or not the ID code of the received signal coincides with a particular ID code stored in advance, and instruction signal outputting means for outputting an operation instruction signal to the lock actuator 1 in response to discrimination of the verification means that the received signal is a legal infrared signal (that the ID code exhibits coincidence).

Further, the infrared receiver R described above and at least the signal discrimination circuit C1 of the electronic control circuit C as a control apparatus (in the embodiment shown, the entire electronic control circuit C) are collectively united to form a single control unit U. The control unit U is built in and held by the switch case B described above such that a reception face of the infrared receiver R is opposed to the outside of the case B.

Further, a first energization circuit 3 for supplying power of a battery B to the electronic control circuit C and a relay circuit 4 having a main switch Sw and a main relay Re are connected to the electronic control circuit C. The relay circuit 4 opens or closes a second energization circuit 5, which interconnects the battery B and various electric systems (including an engine starting circuit) incorporated in the vehicle, to effect energization control of the electric systems.

Operation of the first embodiment described above is described below.

It is assumed now that the motorcycle V is in a parking state and the lock actuator 1 is in a locking operative state so that all of the handle lock mechanism Lh, stand lock mechanism Lm and seat lock mechanism Ls are held in a locking state.

If, in this state, an infrared signal is emitted from the infrared transmitter T toward the infrared receiver R and is received by the infrared receiver R, then the signal discrimination section C1 of the electronic control circuit C verifies and discriminates whether or not the received signal is legal, that is, whether or not the ID code of the received signal coincides with the particular ID code stored in advance. If it is discriminated that the received signal is a legal infrared signal (if the ID code exhibits coincidence), then the signal discrimination section C1 outputs an operation instruction signal to the lock actuator 1 so that the actuator 1 is switched from the locking state into an unlocking state. Consequently, the handle lock mechanism Lh, stand lock mechanism Lm and seat lock mechanism Ls are unlocked at a time. Simultaneously, the electronic control circuit C controls the main relay Re to an energization permission state.

Thus, if the main switch Sw is switched from off to on, then the main relay Re can be switched on, and consequently, energization of all of the electric systems including the engine starting circuit is enabled. Accordingly, if a starter switch not shown is switched on in this state, then the engine starting circuit can be energized to start the engine. Then, upon completion of the starting of the engine, the motorcycle V is placed into a state wherein it can travel.

On the other hand, in order to stop the engine which is in an operating state, the main switch Sw is switched from on to off. Consequently, the energization of the electric systems of the engine is interrupted, and the engine stops. Then, if, in this state, an infrared signal is transmitted from the infrared transmitter T to the infrared receiver R again, then the signal discrimination section C1 of the electronic control circuit C verifies and discriminates whether or not the received signal is legal in such a manner as described above. If it is discriminated that the received signal is a legal infrared signal, then the signal discrimination section C1 outputs an operation instruction signal to the lock actuator 1 to switch the lock actuator 1 from the unlocking state to the locking state. Consequently, the handle lock mechanism Lh, stand lock mechanism Lm and seat lock mechanism Ls are locked at a time. Simultaneously, the electronic control circuit C controls the main relay Re to an energization inhibition state, and therefore, even if the main switch Sw is switched on, the main relay Re is not turned on.

In this arrangement, the infrared receiver R of the remote lock operation apparatus A (particularly in the first embodiment shown, the control unit U wherein the receiver R and the electronic control circuit C are integrated as a unitary member) is disposed in the switch case B with a switch operation element fixed to the bar handle H. As such, the switch case B can be used also as an effective mounting support part for the infrared receiver R (control unit U), thereby simplifying the mounting structure and reducing its weight and size. Further, if the infrared receiver R (control unit U) and the switch case B with the switch operation element Bs are assembled in advance on another assembly line to form a single, small sub-assembly, then the sub-assembly can be easily mounted to the bar handle H at a later time.

Further, the directivity required for the infrared receiver R for the motorcycle V generally is within the range of 45 degrees on the left and the right with respect to a longitudinal center line of the vehicle body as viewed rearwardly from the position of the left and right handle grips Hg of the vehicle in the forward and backward direction of the vehicle body as seen in FIG. 1. Accordingly, the mounted position of the infrared receiver R is preferably set to such a position at which the receiver can cover the directivity range described above without being influenced by the seat S or the vehicle body rear portion. However, since the infrared receiver R is disposed on the switch case B with a switch operation element fixed to the bar handle H (base portion of the handle grip part Hg) as in the present embodiment, there is no obstacle to reception around the receiver R, and the reception performance of the receiver R is raised. In other words, the range of directivity of the infrared receiver R is not adversely influenced by the seat S or the vehicle body rear portion Fr.

Figure 5:
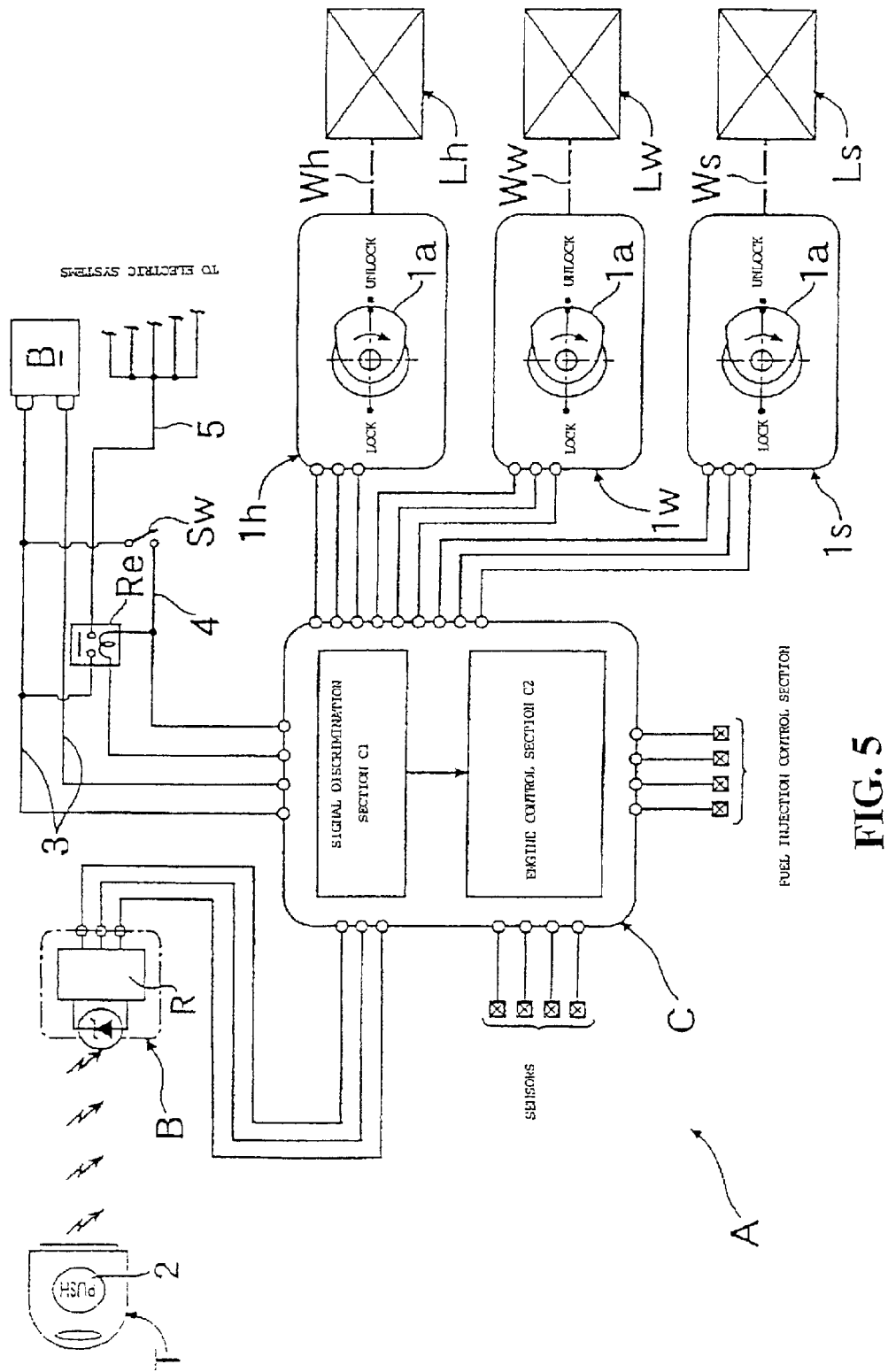
FIG. 5 is a schematic block diagram of a remote lock operation apparatus according to the motorcycle of the second and third embodiments.

A second embodiment of the present invention is shown in FIG. 5. In the second embodiment, a wheel lock mechanism Lw for locking rotation of a wheel is provided in place of the stand lock mechanism Lm of the preceding embodiment. Besides, the wheel lock mechanism Lw, handle lock mechanism Lh and seat lock mechanism Ls are locked and unlocked by means of lock actuators 1w, 1h and 1s for exclusive use, respectively. Accordingly, the lock actuators 1w, 1h and 1s can be disposed in the proximity of the corresponding lock mechanisms Lw, Lh and Ls and can drive the mechanisms effectively, respectively.

Further, in the second embodiment, the infrared receiver R of the remote lock operation apparatus A is built in and held by the switch case B similarly as in the preceding embodiment. However, the entire electronic control circuit C (control apparatus) including the signal discrimination section C1 is disposed at a suitable location of the vehicle body other than the switch case B.

Furthermore, in the second embodiment, the electronic control circuit C described above includes, in addition to the signal discrimination section C1, an engine control section C2 for electronically controlling the engine in response to various operation states and operation conditions. The engine control section C2 outputs, in the embodiment shown, a control signal to a fuel injection control section for the engine in order to control the fuel injection amount of the engine in response to detection signals of a water temperature sensor and other various engine controlling sensors.

Figure 6:
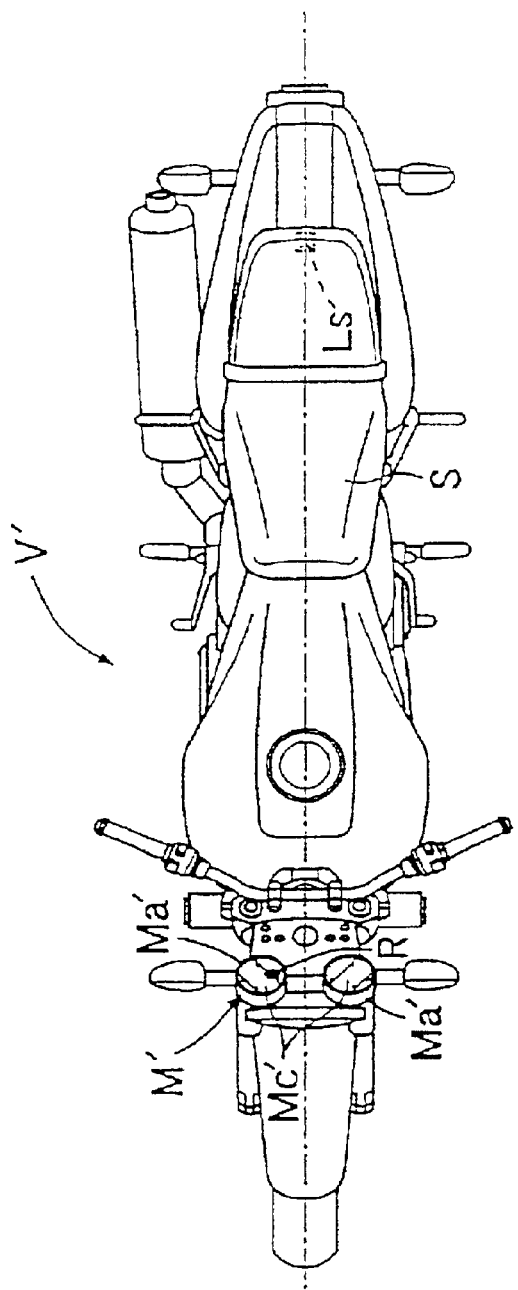
FIG. 6 is a plan view of the motorcycle of the third embodiment.

A third embodiment of the present invention is shown in FIGS. 5 and 6. Like the first and second embodiments, the third embodiment is also applied to a motorcycle. FIG. 5 is a schematic block diagram of a remote lock operation apparatus, and FIG. 6 is a plan view of the motorcycle. FIG. 6 shows an Infrared receiver (R) disposed on a meter body Ma' of one (in the example shown, a speedometer) of a plurality of round meters M' provided in a juxtaposed relationship at a front portion of a vehicle body of the motorcycle V' such that a reception face thereof is directed rearwardly upwards. The receiver (R) is covered with and protected by a round transparent cover Mc' of the meter M'.

It should be noted that the configuration of the remote lock operation apparatus A, as well as the operation and effects, of the three embodiments described above is basically the same.

Figure 7:
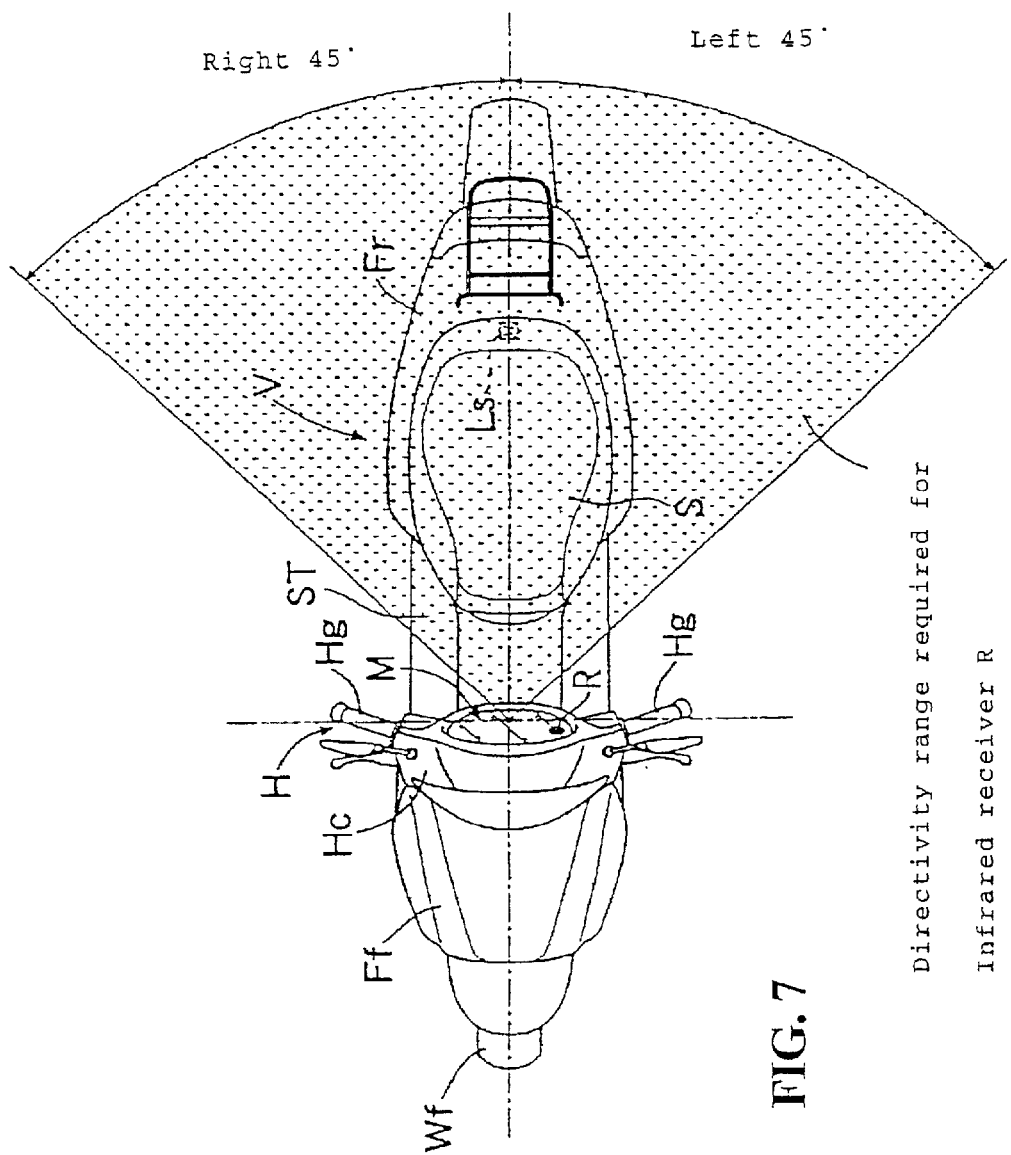
FIG. 7 is a plan view of the scooter of the fourth embodiment.
Figure 8:
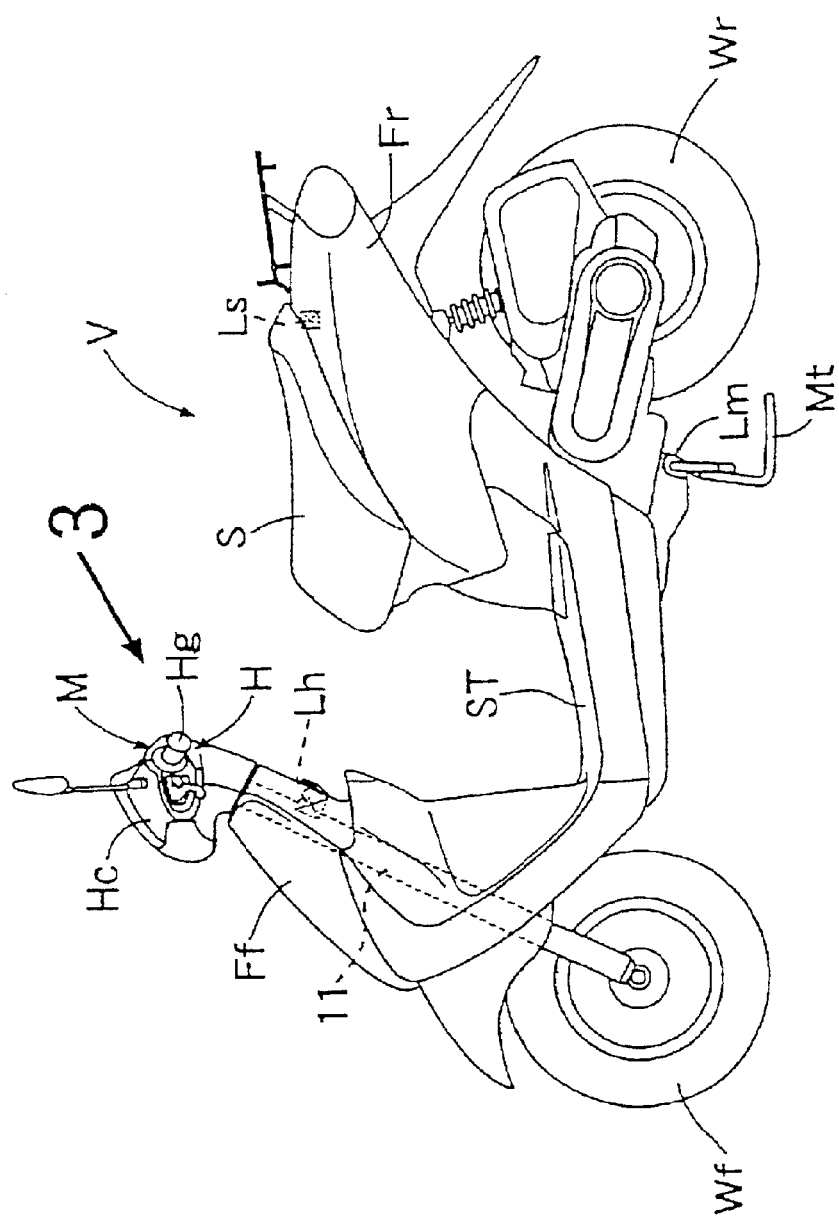
FIG. 8 is a side elevational view of the scooter of the fourth embodiment.
Figure 9:
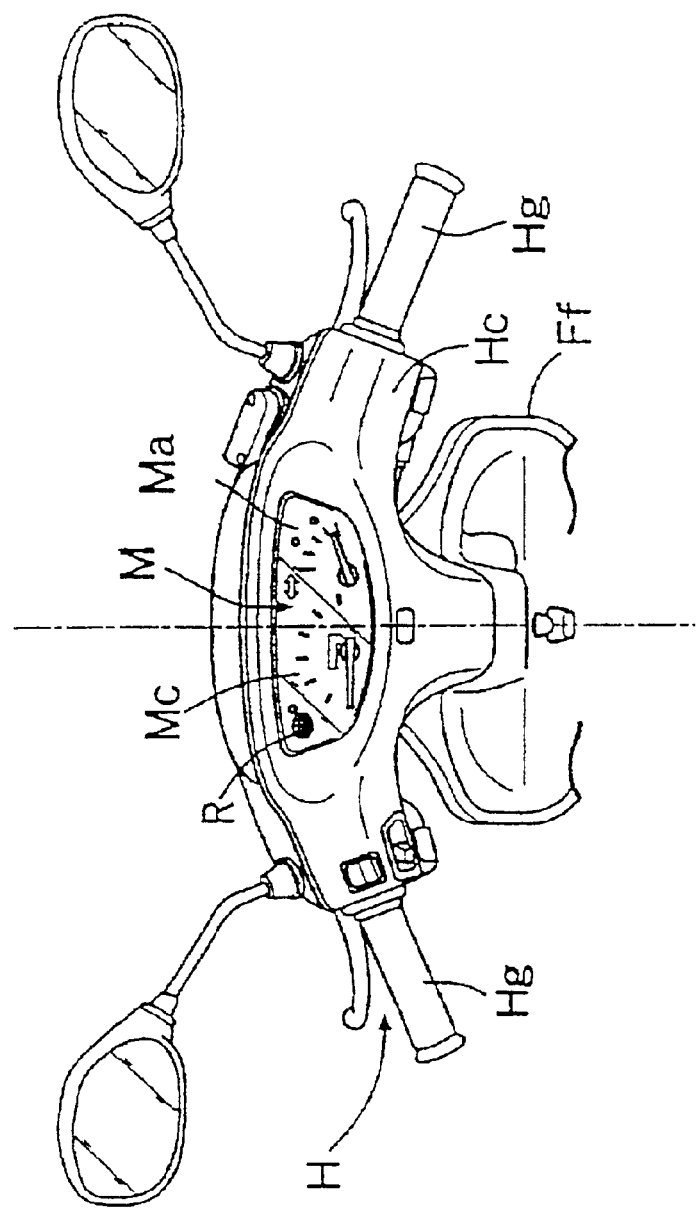
FIG. 9 is an enlarged view of the scooter of the fourth embodiment as viewed in the direction indicated by an arrow mark 3 in FIG. 8, showing a meter, a handle and elements around the meter and the handle.
Figure 10:
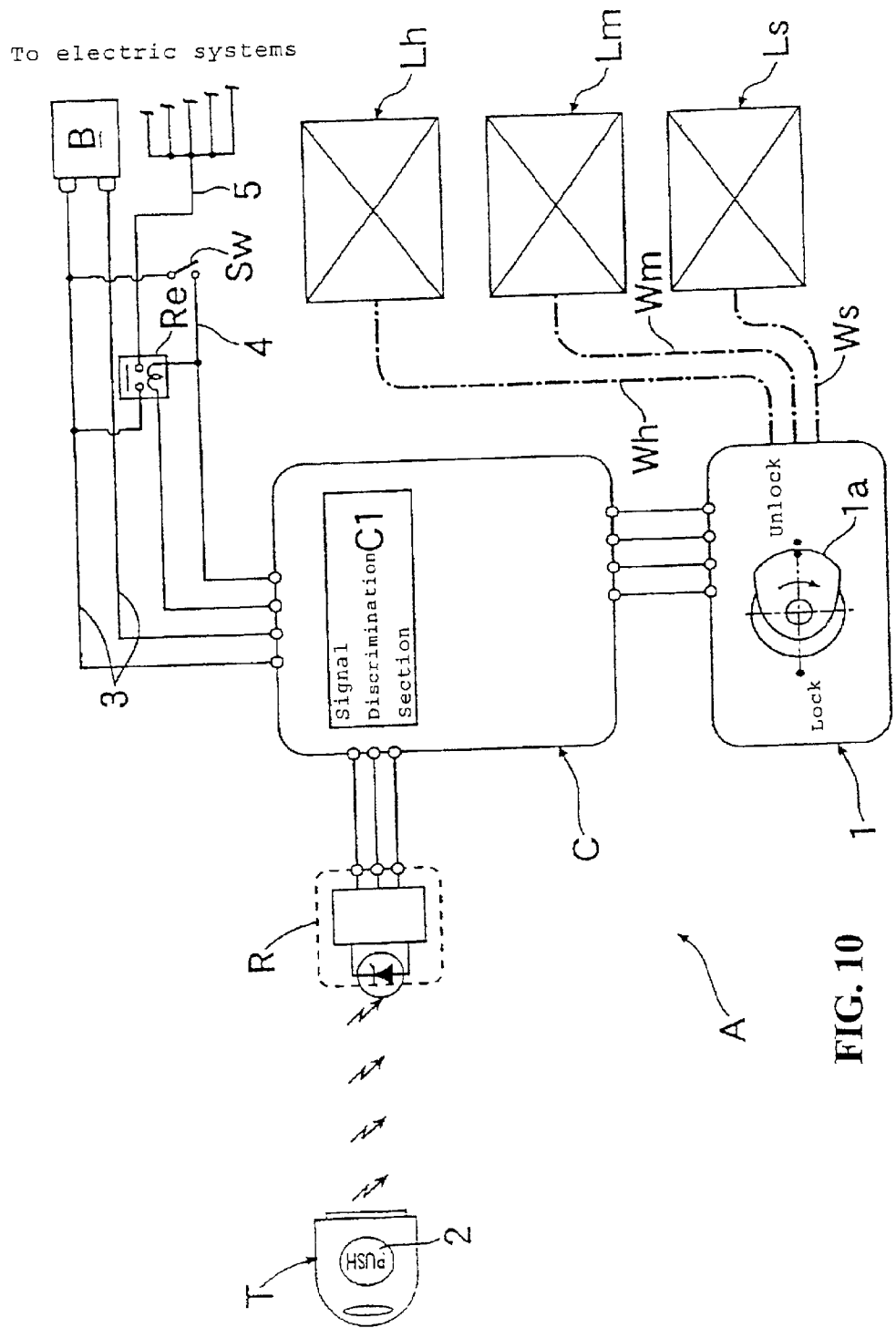
FIG. 10 is a schematic block diagram of a remote lock operation apparatus of the scooter of the fourth embodiment.

Next, in a fourth embodiment of the present invention will be described. The fourth embodiment is applied to a scooter, and is shown in FIGS. 7 to 10. Referring to FIGS. 7 and 8, a scooter V as a light vehicle having no cabin includes a step ST provided between front and rear wheels Wf and Wr for receiving the feet of the driver placed thereon. A seat S on which the driver should be seated is disposed at an upper portion of a rear body cover Fr made of metal or synthetic resin as a vehicle body rear portion which is erected uprightly from a rear end of the step ST. A baggage accommodating seat box (not shown) is disposed in the rear body cover Fr, and the seat S is mounted on the seat box or the like such that the seat S can be opened and closed between a closing position at which the seat S covers an open end of the seat box and an opening position.

Further, the scooter V includes a bar handle H operable for steering the front wheel Wf through a steering shaft 11. The steering shaft 11 is supported for rotation on a head pipe of a vehicle body front frame not shown and extends in an upward and downward, rearwardly inclined posture on the inner side, that is, on the rear side, of a front body cover Ff made of metal or synthetic resin as the vehicle body front portion. A lower portion of the steering shaft 11 is formed in a bifurcated fork for supporting the front wheel Wf for rotation. An upper end of the steering shaft 11 is coupled to a central portion of the bar handle H such that the bar handle H and the steering shaft 11 are turned integrally in accordance with a steering operation.

The central portion of the bar handle H and the upper end portion of the steering shaft 11 are covered in good appearance with a T-shaped handle cover Hc made of synthetic resin or metal which is turned integrally with them. Left and right handle grips Hg at the opposite ends of the bar handle H extend outwardly from the opposite left and right end portions of the handle cover Hc.

A meter M which is inclined rearwardly downwards so that the driver can visually observe it readily is disposed integrally at a central portion of an upper face of the handle cover Hc. The meter M includes a meter body Ma in the form of a flat plate having on an upper face thereof instruments such as a speedometer and a fuel gauge and indicator lamps such as a direction indicator lamp, and a transparent cover Mc made of a transparent material such as an acrylic material for covering and protecting the meter body Ma from above. An Infrared receiver (R) which is hereinafter described is provided at a suitable location of the meter body Ma other than the instruments and the indicator lamps mentioned above such that a reception face thereof is directed rearwardly upwards.

The lock mechanisms Lh, Lm, and Ls of the fourth embodiment are similar to those of the other embodiments. Again, since such lock mechanisms are conventionally known, description of the detailed structure of them is omitted.

Operation of the fourth embodiment described above is described below.

It is assumed now that the scooter V is in a parking state and the lock actuator 1 is in a locking operative state so that all of the handle lock mechanism Lh, stand lock mechanism Lm and seat lock mechanism Ls are held in a locking state.

The Infrared receiver (R) described above is disposed in the meter M and always covered with and protected by the transparent cover Mc of the meter M. Therefore, even if the scooter V does not have a cabin covered therearound with a roof and so forth, there is no possibility that the Infrared receiver (R) may be exposed directly to a wind, rain or the rays of the sun and lose the environment resisting property or be subject to mischief by a third party. Besides, since the transparent cover Mc provided originally for the meter M serves also as a protective cover for the Infrared receiver (R), there is no necessity to provide a special guard mechanism or waterproof mechanism for the receiver (R).

Further, the directivity required for the Infrared receiver (R) for the scooter V generally is within the range of 45 degrees on the left and the right with respect to a longitudinal center line of the vehicle body as viewed rearwardly from the position of the left and right handle grips Hg of the vehicle in the forward and backward direction of the vehicle body as seen in FIG. 7. Accordingly, the mounted position of the Infrared receiver (R) is preferably set to such a position at which the receiver can cover the directivity range described above without being influenced by the seat S or the vehicle body rear portion. However, since the Infrared receiver (R) is disposed on the meter M which is provided at a position higher than the seat S and the vehicle body rear portion in the proximity of the central portion of the vehicle body in the leftward and rightward direction and inclined rearwardly, the range of directivity of the Infrared receiver (R) required for the scooter V can be covered readily.

While the embodiments of the present invention are described in detail, the present invention is not limited to the embodiments described above and various small design changes are possible. For example, while, in the embodiments described above, a plurality of lock mechanisms Ls, Lh, Lm and Lw provided at a plurality of locations of a vehicle can be remotely operated collectively, according to the present invention, only some of the lock mechanisms Ls, Lh, Lm and Lw may be operated remotely. Further, the locking mechanism which is an object of remote operation of the present invention is not limited to those of the embodiments.

Further, while, in the second embodiment, the entire electronic control circuit C (control apparatus) is disposed at a suitable location of the vehicle body other than the switch case B, alternatively at least the signal discrimination section C1 of the electronic control circuit C may be disposed in the switch case B and integrated with the infrared receiver R similarly as in the first embodiment.

As described above, since an infrared receiver of a remote lock operation apparatus is held by a switch case having a manually operable switch operation element and provided on a steering bar handle of the vehicle, the switch case can also be used also as a support part for the infrared receiver. Accordingly, the structure can be simplified and its weight and size reduced. This not only can contribute reduction of the cost, but also can improve the assembling operability of the infrared receiver to the vehicle. Further, since the switch case is disposed at a base portion of a handle grip of the bar handle which is usually provided at a higher position than a seat or a vehicle body rear portion, the range of directivity of the infrared receiver will not be adversely influenced by the seat or the vehicle body rear portion.

Meanwhile, since the infrared receiver and the control apparatus can be formed collectively as a unit and held on the switch case, handling of them is further simplified and facilitated. Besides, the structure of the remote lock operation apparatus can be further reduced in weight and size and simplified.

Further as described above, in a light vehicle having no cabin, an Infrared receiver for a remote lock operation apparatus is disposed on a meter having a transparent cover and provided at a position at which the meter can be visually observed by a driver and is covered with and protected by the transparent cover. Therefore, even if the vehicle does not have a cabin covered therearound, there is no possibility that the infrared receiver may lose the environment resisting property, or be subject to mischief by a third party. Also, since the transparent cover provided originally for the meter serves also as a protective cover for the infrared receiver, there is no necessity to provide a special guard mechanism or waterproof mechanism for the Infrared receiver. Thus the structure is simplified and can be made at low cost. Further, since the meter is usually disposed at a position higher than the seat and the vehicle body rear portion in the proximity of the central portion of the vehicle body in the leftward and rightward direction, the range of directivity of the infrared receiver will not be adversely influenced by the seat or the vehicle body rear portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote lock operation apparatus for a light vehicle having no cabin, comprising:
   a portable infrared transmitter;
   an infrared receiver capable of receiving an infrared signal emitted from said infrared transmitter;
   a lock actuator capable of locking and unlocking a lock mechanism incorporated in a vehicle body;
   a control apparatus for controlling operation of said lock actuator based on the infrared signal received by said infrared receiver; and
   a switch case with a switch operation element manually operable by a passenger,
   wherein said infrared receiver, a signal discriminating circuit of the control apparatus, and the switch case are formed as a single integrated sub-assembly and mounted on a steering bar handle of said vehicle.

2. The remote lock operation apparatus for a light vehicle of claim 1, wherein said locking mechanism further comprises a seat locking mechanism, a handle locking mechanism, and a stand locking mechanism.

3. The remote lock operation apparatus for a light vehicle of claim 1, wherein said locking mechanism further comprises a seat locking mechanism, a handle locking mechanism, and a wheel locking mechanism.

4. A remote lock operation apparatus for a light vehicle having no cabin, comprising:
   a portable infrared transmitter;
   an infrared receiver capable of receiving an infrared signal emitted from said infrared transmitter;
   a lock actuator capable of locking and unlocking a lock mechanism incorporated in a vehicle body;
   a control apparatus for controlling operation of said lock actuator based on the infrared signal received by said infrared receiver; and
   a meter having a transparent cover and provided at a position at which said meter can be visually observed by a driver and is covered with and protected by said transparent cover, said infrared receiver being disposed on said meter,
   wherein the control apparatus is disposed at a suitable location of the vehicle separate from the infrared receiver, the control apparatus including a signal discriminating section.

5. The remote lock operation apparatus for a light vehicle of claim 4, wherein said locking mechanism further comprises a seat locking mechanism, a handle locking mechanism, and a stand locking mechanism.

6. The remote lock operation apparatus for a light vehicle of claim 4, wherein said locking mechanism further comprises a seat locking mechanism, a handle locking mechanism, and a wheel locking mechanism.

7. The remote lock operation apparatus for a light vehicle of claim 4, wherein the control apparatus includes an engine control section and the signal discriminating section.

* * * * *

UNITED STATES PATENT AND TRADEMARK OFFICE
CERTIFICATE OF CORRECTION

PATENT NO. : 6,759,828 B2
DATED : July 6, 2004
INVENTOR(S) : Takeshi Konno

It is certified that error appears in the above-identified patent and that said Letters Patent is hereby corrected as shown below:

Title page,
Insert Item -- [30]      Foreign Application Priority Data
          February 19, 2001      [JP]    Japan            2001-042277 --

Signed and Sealed this

Twenty-eighth Day of June, 2005

JON W. DUDAS
*Director of the United States Patent and Trademark Office*